United States Patent Office 3,153,637
Patented Oct. 20, 1964

3,153,637
BONDING AND SEALING AGENTS
Joachim Schmidt and Heinz Stock, Oberursel, Taunus, and Bernhard Zdralek, Frankfurt am Main, Germany, assignors, by mesne assignments, to United Shoe Machinery Corporation, Flemington, N.J., a corporation of New Jersey
No Drawing. Filed Nov. 6, 1961, Ser. No. 159,810
Claims priority, application Germany Apr. 19, 1961
7 Claims. (Cl. 260—31.2)

This invention relates to a water-free adhesive sealant and coating compositions for surfaces, and particularly to compositions for surfaces difficult to bond.

Non-aqueous coating and sealant compositions, solvent-containing or solvent-free, based on natural rubber, reclaimed rubber, synthetic rubbers, and a variety of synthetic polymers and resins, are well known for adhesive and coating usage. These materials vary widely in their chemical and physical nature, and the surfaces to which they are applied also vary widely in their chemical and physical nature. Improvement of their ability to adhere to difficultly bondable surfaces, such as surfaces which are oily, moist, waxy or greasy, has required that they be modified by the incorporation of various special ingredients.

Such a modification was the introduction of cation-active surface agents, such as a quaternary ammonium compound, in resin based or rubber based coating, sealing or cement compositions, as set forth in United States application Serial No. 87,745, filed February 8, 1961, in the names of Joachim Schmidt, Heinz Stock, and Bernhard Zdralek, and now abandoned, of which the present application is a continuation-in-part.

However, it has now been found that not all cation-active surface active compounds give the same improvement in ability to bond to difficultly bondable surfaces. It is, therefore, an object of the present invention to provide water-free resin-based or rubber-based adhesive and coating composition having improved adhesion to surfaces of a variety of materials which have been difficult to bond or to materials of which the surfaces are oily, waxy, greasy or moist, and hence difficult to bond.

To this end, and in accordance with a feature of the present invention, we have found that substantial improvement in bonding these surfaces is consistently attained by incorporating a minor amount of certain cation-active materials known as long chain amines and fatty amine-carboxylic acid derivatives in which the carbon chain of the fatty acid amine has from 18 to 22 atoms.

It is a further object of the present invention to provide a polychloroprene adhesive capable of establishing to a wide variety of materials strong bonds, particularly bonds of the strength and character required for shoe sole attaching.

To this end, and in accordance with a further feature of the present invention, we have incorporated ketone resins in polychloroprene adhesives in addition to known modifier materials such as, natural and synthetic resins, mineral fillers, etc. used in such adhesives.

Coating, sealant and adhesive compositions capable of modification according to the present invention to improve their capacity to hold to difficult bondable surfaces include a very wide variety of water-free compositions based on natural rubber, reclaimed rubber, synthetic rubber, polysulfide polymers, polyisobutylene, polyester resins, polyepoxide resins, phenol formaldehyde resins, etc. The compositions, according to the present invention, may contain volatile organic solvents or may be solvent free. The addition to the compositions of a small amount of the long chain fatty amine or fatty amine derivative of a carboxylic acid causes a marked improvement in their bonding ability.

The long chain fatty amines and carboxylic acid-fatty amine derivatives of the present invention must have a fat acid carbon chain within a definite range to provide the superior action. Fatty amines and the fatty amine portion of carboxylic acid-fatty amine derivatives which have from 12 to 14 carbon atoms proved to be markedly less effective, but those having carbon chains of at least 18 atoms resulted in a surprising increase of ability to adhere almost to an ideal state, i.e., a state in which adhesion overbalances cohesion. A preferred fatty amine compound is one having a carbon chain of 18 to 22 atoms.

It has been found that commercially available fatty amines are undesirable since they are mixtures of amines of different carbon chain lengths and may contain a high percentage of fatty amine having a carbon chain of less than 18 atoms, and therefore be markedly less effectual.

In addition to pure fatty amines, fatty amine derivatives of carboxylic acids are also effective. The carboxylic acids with which they are compounded may be saturated or unsaturated aliphatic or aromatic mono- or dicarboxylic acids. The pH value of the acid-fatty amine compound is a decisive factor in obtaining the maximum effect. It has been found that 1% aqueous extracts obtained from boiling fatty amine compounds with carboxylic acid should have a pH value of 6.0, preferably 5.0 to 5.5. A considerable deviation from this pH value toward either a more acid or more neutral area results in a correspondingly increasingly less effective bonding in the practice of the invention. In certain cases, the salts referred to when in the optimum pH area are more effective than the fatty amines alone.

The cationic-active fatty amine ingredient is added in amounts from 0.04% to 5.0% by weight of the total composition, preferably from 0.04% to 2%.

In the particular field of polychloroprene adhesives, an improvement in adaptability of the adhesives to bond soling materials of different types is also achieved with relatively small additions of ketone resins. Marked improvements have been obtained with as little as about a 3% of resin based on the weight of the neoprene, although it is possible to use up to an equal weight of ketone resin with respect to polychloroprene. Adhesives containing such proportions of ketone resins have been found capable of bonding both leather soles and filled rubber soles of different compositions including oil, plasticized synthetic rubber soles as well as transparent sole mixtures to shoe uppers.

Ketone resins made by the condensation of ketone with aldehyde or by condensing different ketones are known, but their utilization is limited to the following fields of application: Insulating material, organic glass, lacquer resins, and intermediate layers for safety glass (Scheiber, "Chemie & Technologie der Kuenstlichen Harze," page 316 ff.; Kittel, "Farben-, Lack- und Kunststofflexikon," page 372 ff.; Merkblatt der BASF ueber Kunstharz AW2). As regards the use of ketone resins Luettgen writes in "Die Technologie der Klebstoffe" on page 141: "These resins have not attained a particular importance in the adhesive industry." Subsequently, the manufacture of water soluble aldehyde ketone resins is described and their use as resin glue for wood is also mentioned. On page 280 of the same book, the utilization of an aqueous dispersion of a ketone resin has been described as an additive to a starch solution for gluing corrugated paper. In all these instances ketone resins are used only in combination with aqueous glues for wood and cardboard. Moreover, the above-mentioned portions of the literature concern only water soluble ketone resins, which are cured after bonding by certain additives, and these ketone resins have no relation to those used in the present invention, which are solvent soluble, water insoluble ketone resins from condensation of an alkyl, or aryl alkyl, or alicyclic ketone with itself, or another ketone or with an aldehyde.

It has been found that among the ketone resins, the ketone resin made from the condensation of 1 part of cyclohexanone with 2 parts of methyl cyclohexanone in the presence of potassium hydroxide in methanol is especially advantageous as an additive for chloroprene adhesives, since it renders these usable for most sole materials. In the further development of this recognition, a possibility was sought to achieve satisfactory bonding with greasy upper leather and with rubber having wax-like or greasy surfaces. With these materials, the anchorage ability of adhesives has been so small that their shear resistance cannot withstand even small stresses. Although substantial improvements in bonding these work pieces, which are difficult to bond, have been achieved by using ketone resins, the last difficulties in bonding are overcome by incorporation of long chain fatty amine and fatty amine-carboxylic acid derivative compounds into the adhesive of the invention.

A series of tests proved the ability of the coating, sealant and adhesive compositions containing the materials added according to the present invention to be surprisingly effective in adhering to or penetrating into all kinds of surfaces. It has not been possible to explain scientifically the cause for the effect achieved by the addition according to the present invention of the fatty amines or the fatty amine-carboxylic acid derivatives to sealant compositions known per se. It has been noted that "chemically closely related" compounds result in no increase of adhesive characteristics, or only to a very limited degree.

The invention relates to a very limited area of compounds, established by an extended series of tests, selected from known cation active materials. The following examples are given to aid in understanding the invention, but it is to be understood that the invention is not restricted to the materials, proportions or procedures of the examples:

*Example I*

| | Parts by weight |
|---|---|
| Natural rubber | 11.00 |
| Zinc oxide | 11.30 |
| Resin ester | 15.00 |
| Petroleum spirits (boiling point range 80°–110° C.) | 20.00 |
| Toluol | 21.00 |
| Petroleum spirits (boiling point range 35°–65° C.) | 20.00 |
| Phthalic acid fatty amine (18–22 carbon atoms in the chain) | 1.70 |
| | 100.00 |

This adhesive based on natural rubber is employed in the auto industry for adhering lining material to the body. Although the body parts are usually delivered in a cleaned condition for upholstering, quite frequently the body parts are soiled and the effect of prior adhesives is impared or even nonexistent. The present adhesive makes it possible to ignore the condition of the body parts since its effect is not diminished by oil or dirt. The method of application is identical to prior adhesives.

*Example II*

| | Parts by weight |
|---|---|
| Liquid polysulfide | 58.00 |
| Zinc sulfide | 23.20 |
| Carbon black | 5.70 |
| Phenol resin | 2.90 |
| Stearic acid | 1.20 |
| Lead peroxide | 4.40 |
| Dibutyl phthalate | 1.70 |
| Xylol | 1.40 |
| Maleic acid fatty amine (20–22 carbon atoms in the chain) | 1.50 |
| | 100.00 |

This composition is a sealant, comprising two components which are to be mixed before usage. This sealant has high resistance against chemicals and aging for sealing joints in buildings severely exposed to the weather. The addition of maleic acid fatty amine increases the adhesion ability of the sealant to moist and not thoroughly cleaned building parts. The sealant cures to a rubbery resilient condition and maintains its sealing characteristics over long periods. The maleic acid fatty amine is produced as follows: 31.4 kg. fatty amine having 20–22 carbon atoms in the chain is coarsely ground and melted at about 80° C. in a porcelain enameled container. 12.0 kg. maleic acid is slowly added to the molten fatty amine by fast stirring, whereby the molten mass increases its thickness to a pasty condition. During cooling the molten mass solidifies. A 1% aqueous extract by boiling of this mass will have a pH value of 5.5.

The method of application remains the same as in prior sealants.

*Example III*

| | Parts by weight |
|---|---|
| Polyisobutylene (mol wt. 200,000) | 10.00 |
| Mineral oil | 30.00 |
| Filler (minerals and pigments) | 55.00 |
| Neat's-foot oil | 3.70 |
| Fatty amine acetate (18–22 carbon atoms in the chain) | 1.30 |
| | 100.00 |

This composition relates to a permanently flexible and permanently adhesive sealant which in a preformed condition can be used, for instance for sealing building components. The addition of acetic acid fatty amines makes it possible for the sealant to adhere to difficultly adhesive surfaces.

*Example IV*

| | Parts by weight |
|---|---|
| Liquid epoxy resin | 44.43 |
| Liquid polysulfide | 22.21 |
| Powdered quartz | 33.32 |
| Fatty amine (22 carbon atoms in the chain) | 0.04 |
| | 100.00 |

The addition of fatty amine to this composition of polysulfide and epoxy resin results in adhesion to metal, glass or other surfaces difficult to adhere by adhesives not containing the adhesion improving components, for example strongly discoloring phenol resin.

The method of application remains the same as in other coating compositions.

*Example V*

| | Parts by weight |
|---|---|
| Polychloro-2-butadiene | 15.00 |
| Mixture of zinc oxide and magnesium oxide | 1.30 |
| Curable phenol resin | 3.00 |
| Cumarone resin | 1.50 |
| Self-condensation resinous product of cyclohexanone methyl cyclohexanone | 1.50 |
| Fatty amine phthalate (20–26 carbon atoms in the chain) | 0.20 |
| Solvent mixture of petroleum spirits (80° to 110° boiling point range) toluol and ethyl acetate equal part by volume | 77.50 |
| | 100.00 |

This adhesive mainly used in the shoe industry is suited for combining materials which are difficult to adhere together, for example fatty shoe-upper and oil-plasticized rubber soles.

The method of application is identical with usual shoe adhesions.

Having thus described our invention, what we claim as new and desire to secure by Letters Patent of the United States is:

1. Non-aqueous liquid adhesive compositions comprising polychloroprene and a resinous condensation product of cyclohexanone and methyl cyclohexanone for application to surfaces to form a solid adherent deposit and possessing the ability to wet and bond greasy surfaces, said compositions including from 0.04% to 5% by weight of cationic surface-active agent calculated on the weight of said composition, said cationic surface-active agent being a member of a group consisting of fatty monoamines and fatty mono-amine carboxylic acid salts in which the fatty amine has a carbon chain of from 18 to 22 carbon atoms.

2. Non-aqueous liquid adhesive composition for application to a surface to form a solid adherent deposit and possessing ability to wet and bond greasy surfaces, said composition comprising a volatile organic solvent solution of polychloroprene from about 3% to about 100% of the weight of the polychloroprene of a resinous condensation product of cyclohexanone and methyl cyclohexanone, and from 0.04% to 5% by weight based on the weight of said adhesive composition of a fatty monoamine carboxylic acid salt, in which the fatty monoamine has a carbon chain of from 18 to 22 carbon atoms and giving in 1% aqueous solution a pH value of from 5.0–6.0.

3. A non-aqueous composition for application to surfaces to form a solid adherent deposit and possessing ability to wet and bond greasy surfaces, said composition being based on a member of the group consisting of natural rubber, curable polyepoxide resin, polysulfide polymer, polyisobutylene and polychloroprene and including from about 0.04% to about 5% by weight of cationic surface-active compound calculated on the weight of said composition, said cationic surface-active compound being a member of the group consisting of fatty mono-amines and fatty mono-amine carboxylic acid salts in which the fatty amine has a carbon chain of from 18 to 22 carbon atoms.

4. Non-aqueous liquid adhesive compositions for application to surfaces to form a solid adherent deposit and possessing ability to wet and bond greasy surfaces as defined in claim 3 in which the composition is based on natural rubber.

5. Non-aqueous adhesive compositions for application to surfaces to form a solid adherent deposit and possessing ability to wet and bond greasy surfaces as defined in claim 3 in which the composition is based on liquid epoxy resin.

6. Non-aqueous sealant compositions for application to surfaces to form a solid adherent deposit and possessing ability to wet and bond greasy surfaces as defined in claim 3 in which the composition is based on liquid polysulfide polymer.

7. Non-aqueous sealant compositions for application to surfaces to form a solid adherent deposit and possessing ability to wet and bond greasy surfaces as defined in claim 3 in which the composition is based on polyisobutylene.

References Cited in the file of this patent

UNITED STATES PATENTS

| | | |
|---|---|---|
| 2,271,468 | Watkins | Jan. 27, 1942 |
| 2,366,219 | Soday | Jan. 2, 1945 |
| 2,410,623 | Ballard et al. | Nov. 5, 1946 |
| 2,923,641 | Graf | Feb. 2, 1960 |
| 3,004,867 | Collins et al. | Oct. 17, 1961 |

OTHER REFERENCES

Rohm & Haas Co., Tertiary-Alkyl Primary Amines, Rohm & Haas Co., Washington Square, Philadelphia 5, Pa., pp. 3 and 16, September 1954.